United States Patent
Stewart

(10) Patent No.: US 6,870,843 B1
(45) Date of Patent: Mar. 22, 2005

(54) SELF IMPLEMENTING MULTICAST LEVEL ESCALATION

(75) Inventor: Ian A. Stewart, Carpinteria, CA (US)

(73) Assignee: World Multicast.Com, Inc., Venture, CA (US)

( * ) Notice: Subject to any disclaimer, the term of this patent is extended or adjusted under 35 U.S.C. 154(b) by 797 days.

(21) Appl. No.: 09/602,601

(22) Filed: Jun. 22, 2000

Related U.S. Application Data

(60) Provisional application No. 60/140,238, filed on Jun. 22, 1999.

(51) Int. Cl.[7] .............................................. H04L 12/28
(52) U.S. Cl. ...................................... 370/390; 370/252
(58) Field of Search ................................. 370/261, 389, 370/390, 432, 401

(56) References Cited

U.S. PATENT DOCUMENTS

| | | | |
|---|---|---|---|
| 5,251,205 A | 10/1993 | Callon et al. .................. | 370/60 |
| 5,727,002 A | 3/1998 | Miller et al. ................... | 371/32 |
| 5,802,042 A | 9/1998 | Natarajan et al. ........... | 370/255 |
| 6,006,267 A | 12/1999 | Nguyen et al. ............. | 709/227 |
| 6,169,741 B1 * | 1/2001 | LeMaire et al. ............ | 370/401 |
| 6,233,017 B1 * | 5/2001 | Chaddha ................ | 375/240.12 |

* cited by examiner

*Primary Examiner*—Chi Pham
*Assistant Examiner*—Derrick W. Ferris
(74) *Attorney, Agent, or Firm*—Black Lowe & Graham

(57) ABSTRACT

A system, method and computer readable medium for allowing multicast receiving at a user computer coupled to a subnetwork that is coupled to a public data network. The present invention determines if a request to receive a multicast signal has occurred, tests a subnetwork for a first multicasting protocol, if it a request to receive a multicast signal was determined to have occurred, implements the first multicasting protocol, if the result of the test is above a criteria. If the result of the test is below the criteria, the invention tests a subnetwork for a subsequent multicasting protocol and implements the subsequent multicasting protocol, if the Ad result of the test is above the criteria. The testing of a subnetwork for a subsequent multicasting protocol and implementing the subsequent multicasting protocol, is repeated until the result of the test is above the criteria.

6 Claims, 4 Drawing Sheets

```
05 SUB(SIMPLE,Serr)
10 IF Ipmulticast  REM  (Has there been a request for a
                   REM    Multicast Join?)
   ELSE RETURN    REM Exit
20 CALL PING(AllPimRouters,ExitStat,PingError)
30 IF ExitStat
   CALL INITPIM(PIMErr)  REM (If ping successful Initialize
                   REM    PIM RFWC XXXXX)
   RETURN
40 CALL INITMBGP(BGPErr)
   CALL INITPIM (PIMErr)
   RETURN
```

FIG. 5.

SELF IMPLEMENTING MULTICAST LEVEL ESCALATION

This invention claims priority from U.S. Provisional Application 60/140,238 filed Jun. 22, 1999.

FIELD OF THE INVENTION

This invention relates to multicasting on a data network, and more particularly to television broadcasting on the Internet.

BACKGROUND OF THE INVENTION

Internet Protocol (IP) multicasts are addressed to a certain range of IP Address Numbers. Multicasts are recognized by the numeric address range of the IP number. There exist a number of protocols and related methods for distributing IP multicast television and radio signals across the Internet. In theory, the multicast signals are transmitted to the Internet Service Providers (ISPs) so the multicast signals can be received by the end users. Any transmission in the multicast address range is a multicast. This is analogous to a range of telephone numbers being assigned for conference calling.

Many computers with Internet access are incapable of receiving IP multicasts. Even though almost all routers include multicast support, most public networks providers (Internet Service Providers (ISPs)) choose not to enable or support IP multicasts. The ISPs have been reluctant to implement IP multicast software because of fears that this will reduce bandwidth and, thereby, reduce billings. Also, due to complexity it would seem that the ISP might have a case against implementation because it sometimes holds true with computers that increased complexity means decreased stability.

Some solutions have been provided for trying to answer the above concerns. For example, U.S. Pat. No. 6,046,989 to Takahashi discloses a system for multicast communication with a plurality of registered users assigned respective target addresses and dynamic updating of a multicast connection group. The disadvantages of Takahashi is that by cataloging the channels (IP multicast address) the end user is not aided in receiving a channel. This is comparable to knowing that the Super Bowl was on channel 2 but not having a TV to receive it. Takahashi fails to create a simple method for the end user to connect to Internet television programming.

In another example, U.S. Pat. No. 5,982,775 to Brunner discloses a system for forwarding multicast frames over an Ethernet bridged network infrastructure. Brunner fails to deal with the reception of Internet Broadcasts (IP multicasts) but rather is attempting to forward the broadcasts across an Ethernet (a network typically used to plug computers together in the office). The end user still needs a smart appliance to receive them.

Therefore, there exists a need for providing easy access to IP multicast transmissions.

SUMMARY OF THE INVENTION

A system, method and computer readable medium for allowing multicast receiving at a user computer coupled to a subnetwork that is coupled to a public data network is provided. The present invention determines if a request for a mulitcast join has occurred, tests a subnetwork for a first multicasting protocol, if it a request for a mulitcast join was determined to have occurred, implements the first multicasting protocol, if the result of the test is above a criteria. If the result of the test is below the criteria, the invention tests a subnetwork for a subsequent multicasting protocol and implements the subsequent multicasting protocol, if the result of the test is above the criteria. The testing of a subnetwork for a subsequent multicasting protocol and implementing the subsequent multicasting protocol, is repeated until the result of the test is above the criteria.

An object of the present invention is to allow the users of computers to receive Internet based television and radio like signals.

The present invention is a method to implement any "open" or proprietary multicast standards. Different routing protocols (open or not) are automatically implemented on a user's computer, thereby making it easy for a user to connect to an Internet multicast transmission.

As will be readily appreciated from the foregoing summary, the invention provides a system, method and computer readable medium for allowing multicast receiving at a user computer coupled to a subnetwork that is coupled to a public data network.

BRIEF DESCRIPTION OF THE DRAWINGS

The preferred embodiment of this invention is discussed in detail below with reference to the following drawings.

FIG. 5 is example source code for the process illustrated in FIG. 4.

DETAILED DESCRIPTION OF THE PREFERRED EMBODIMENT

Figure 1:
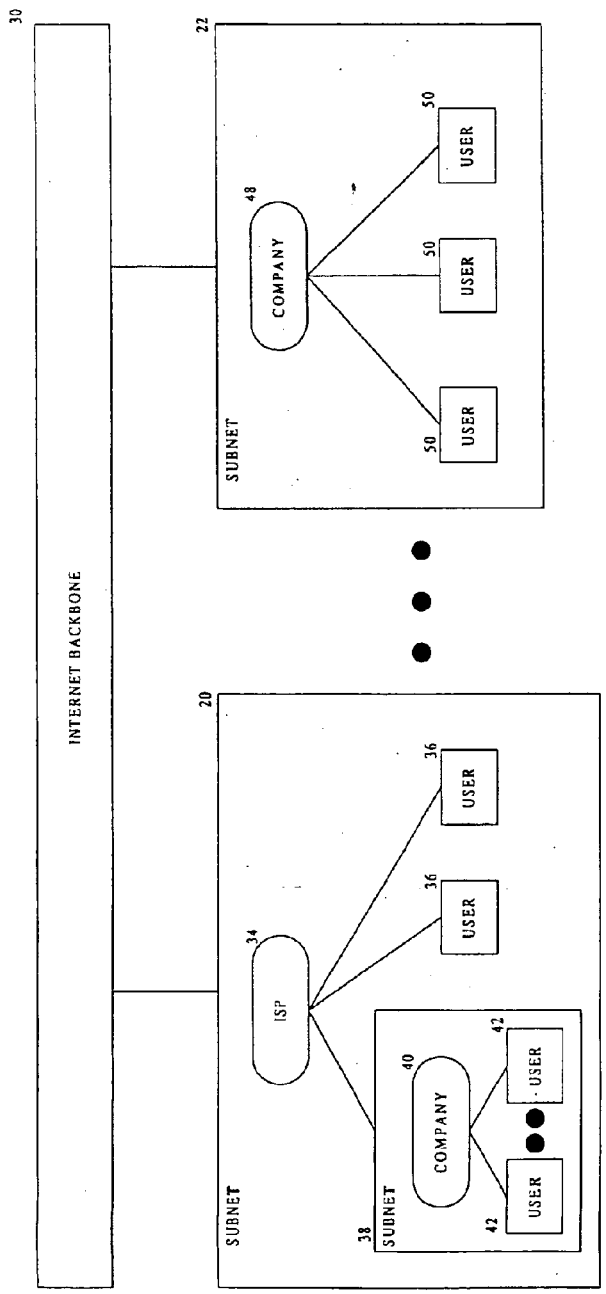
FIG. 1 illustrates a block diagram of example subnetwork environments that interact with the present invention.

The present invention provides a system, method and computer readable medium for allowing multicast receiving at a user computer within a subnetwork (subnet) that is coupled to a public data network (Internet) or for user systems directly connected to the network. FIG. 1 illustrates example network environments where user/client systems receive multicast signals, such as television or radio. Multiple subnets are coupled to the Internet backbone 30. The subnets include user/client systems, content provider systems or a combination of the two. For example, a first subnet 20 includes an Internet Service Provider (ISP) 34 that allows multiple user systems 36 and a company's subnet 38, with a server system 40 coupled to internal user systems 42, to communicate with other systems over the backbone 30. Subnet 22 includes a company's server system 48 coupled to internal user systems 50. Other configurations of subnets may be used with the present invention.

Figure 2:
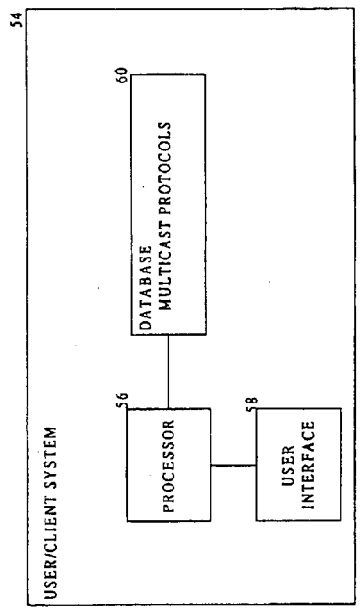
FIG. 2 is a block diagram of an example user system formed in accordance with the present invention.

FIG. 2 illustrates the components of a user/client system 54 formed in accordance with the present invention. The user/client system 54 includes a processor 56 or other device for controlling communication to and from the backbone 30, a user interface 58, such as a display, keyboard or other user interface device, and a database 60. The database 60 or memory stores a plurality of multicasts protocols and software components for directing the processor 56 to perform the functions of the present invention. The software components include a testing component for testing/asking the subnet and its components (routers and user systems) about multicast protocol use, and a controlling component for initializing one of the stored multicast protocols according to the results of the testing component. Essentially, the processor 56 performs protocol level escalation. Some example "open" internet standards stored in the database 60 are Multicast Protocol Extensions for Border Gateway Protocol (BGP-4) and Protocol Independent Multicast (PIM)-Sparce Mode. The database 60 also stores proprietary multicast protocols. The process performed by the software components of the present invention are described below with respect to FIGS. 3 and 4.

Figure 3:
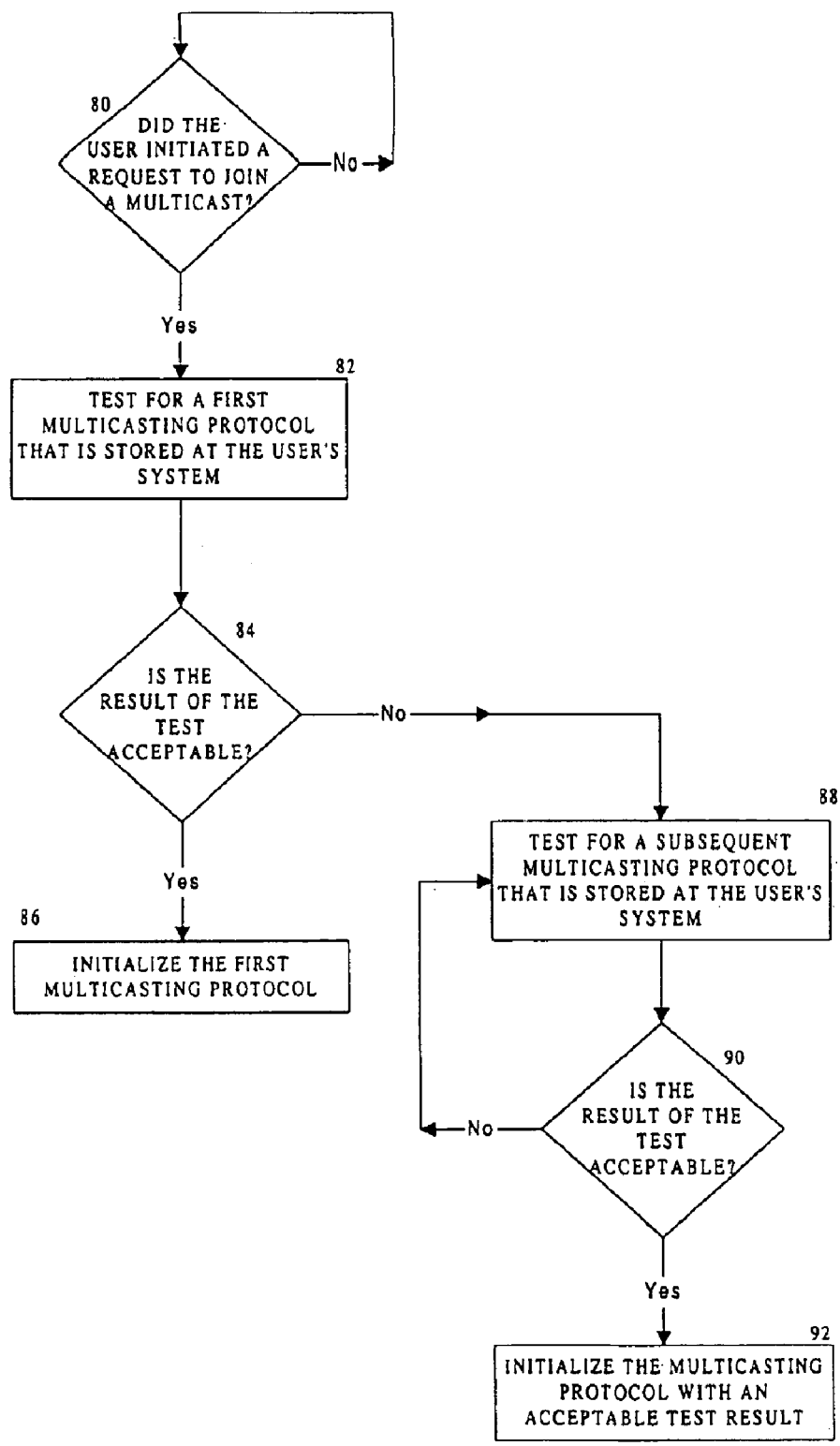
FIGS. 3 and 4 are flow diagrams for performing the process of the present invention.

As shown in FIG. 3, first, at decision block 80, the user system's processor 56 under control from the software components stored in the database 60, checks to see if a request to join a multicast has occurred. This is a continual check that is simply seeing if the user has selected or there is an automatic selection of a web address of a site that sends a multicast signal. If there is a request to join a multicast, at block 82, the testing component test the subnet and its components for a first one of the locally stored multicasting protocols. Next, at decision block 84, the processor 56 analyzes the results of the test according to the type of response received from the subnet. If a message is received from the subnet or a component thereof that the multicast protocol tested for can or is being used and the processor 56 determines that the received message meets a preset criteria, at block 86, the processor 56 initializes the tested-for multicast protocol and reception of the multicast signal occurs. If either a message is not received from the subnet or a component thereof that the multicast protocol tested for can or is being used, or the processor 56 determines that the received message does not meet the criteria, at block 88, the testing component tests the subnet for a subsequent one of the locally stored multicasting protocols. Then, at decision block 90, if a message is received from the subnet or a component thereof, that the subsequent multicast protocol tested for can or is being used and the processor 56 determines that the received message meets the criteria, at block 92, the processor 56 initializes the tested-for subsequent multicast protocol and multicasting occurs. If, at decision block 90, either a message is not received from the subnet or a component thereof, that the subsequent multicast protocol tested for can or is being used, or the processor 56 determines that the received message does not meet the criteria, the process returns to block 88 until an acceptable multicast protocol is found. If an acceptable multicast protocol is not found, the multicast protocol with the best results, when compared to the criteria, is used, or a default multicast protocol is used.

Figure 4:
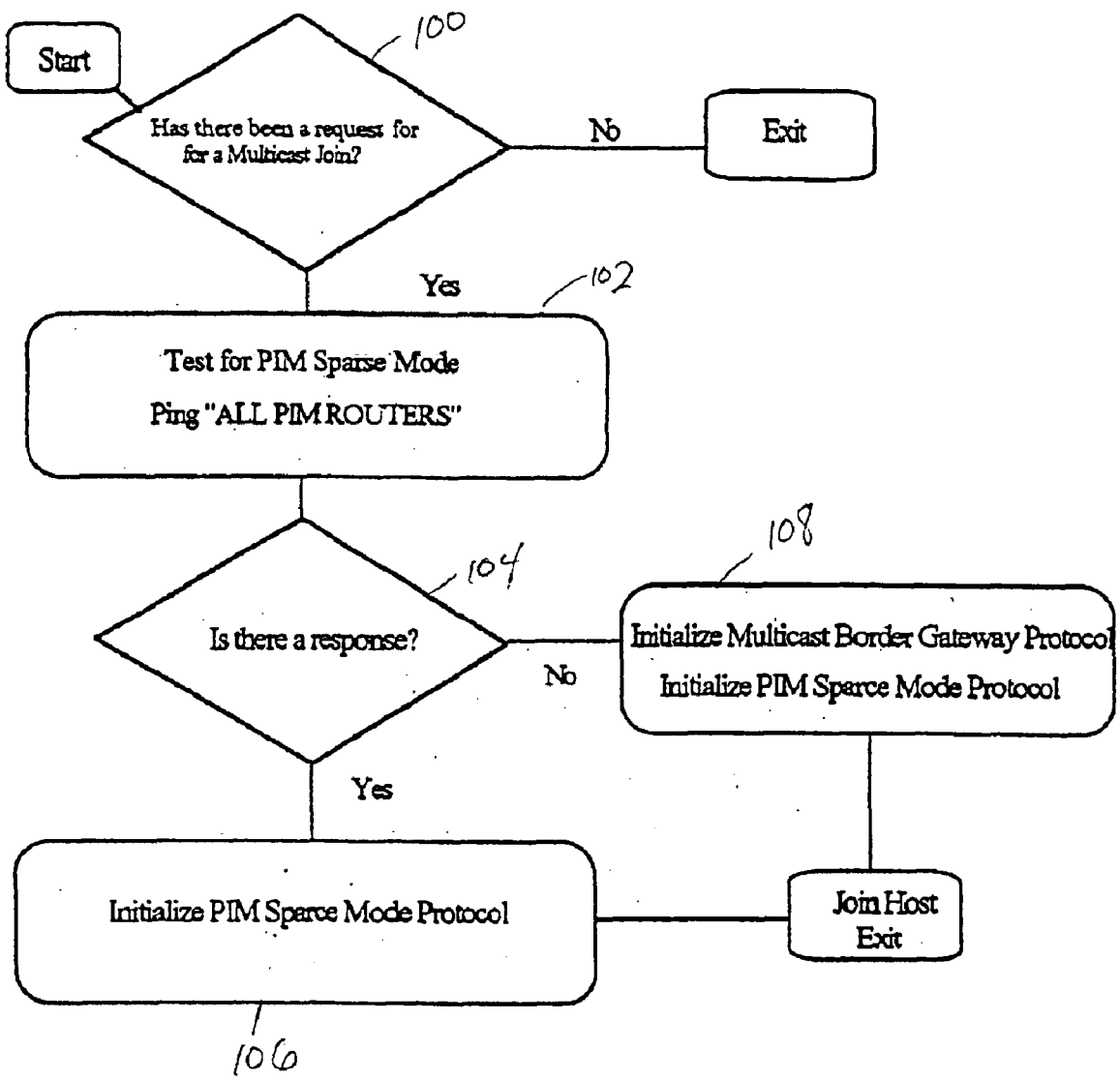

As shown in the example of FIG. 4, the present invention watches Internet transmissions for multicast joins. Joins are requests to become part of the group that are receiving the multicast signal. When the present invention sees a multicast join command, it interrupts the program flow to test for multicasting protocols available on the network. In this example the PIM Sparce Mode is tested for by pinging the "All PIM Routers" IP address. If the current level of protocol fails (there is no response to the query for PIM routers) the next level of protocol is enabled (BGP-4). By self implementing different routing protocols (open or not) the present invention, the user need not be concerned with the protocols being used. The user can concentrate on the viewing the received multicast data and not get mired down in manual programming of different protocols.

FIG. 5 shows a simple source code construction for the process illustrated in FIG. 4.

While the preferred embodiment of the invention has been illustrated and described, it will be appreciated that various changes can be made without departing from the spirit and scope of the invention.

What is claimed is:

1. A method for receiving over a public data network a multicast signal at an end user system coupled to the public data network, the end user system performing the method comprising:

determining if a request to receive the mulitcast signal has occurred;

testing a subnetwork for a first multicast routing protocol, if a request to receive the mulitcast signal was determined to have occurred;

implementing the first multicast routing protocol, if the result of the test includes a received message indicating the first multicast routing protocol is one of a protocol capable of being used or presently being used and the received message meets a preset criteria;

testing the subnetwork for a subsequent multicast routing protocol, if the result of the test for the first multicast routing protocol includes one of the received message indicating the first multicast routing protocol is not one of a routing protocol capable of being used or is not presently being used, or the received message fails to meet the preset criteria; and implementing the subsequent multicast routing protocol, if the result of the test for the subsequent multicast routing protocol includes a received message indicating the first multicast routing protocol is one of a routing protocol capable of being used or presently being used and the received message meets the preset criteria; and repeating testing a subnetwork for a subsequent multicast routing protocol and implementing the subsequent multicast routing protocol, until the result of the test includes a received message indicating the subsequent multicast routing protocol is one of a routing protocol capable of being used or is presently being used and the received message meets the present criteria.

2. The method of claim 1, wherein the testing tests a subnetwork that does not include the user system.

3. The method of claim 1, wherein if the testing fails to produce a result above the criteria, a default multicast protocol is implemented.

4. An end user system for receiving at a public data network a multicast signal coupled to the public data network, the end user system comprising:

memory (60) for storing a plurality of multicast protocols;

a user interface (58) for allowing a user to request a multicast signal from a source coupled to the public data network; and a processor (56) for communicating with the public data network, the processor comprising:

a determining component for determining if a request for a multicast join has occurred;

a testing component for testing a subnetwork for a first multicast routing protocol, if a request for a multicast join was determined to have occurred; and a multicast component for implementing the first multicast routing protocol, if the result of the test includes a received message indicating the first multicasting routing protocol is one of a routing protocol capable of being used or presently being and the received message meets a preset criteria;

wherein the testing component tests the subnetwork for a subsequent multicast routing protocol, if the result of the test for the first multicast routing protocol includes one of the received message indicating the first multicast routing protocol is not one of a routing protocol capable of being used or is not presently being used, or the received message fails to meet the present criteria, the processor repeats testing a subnetwork for a subsequent multicast routing protocol and implementing the subsequent multicast routing protocol, until the result of the test is above the criteria.

5. The system of claim 4, wherein the testing component tests a subnetwork that does not include the user system.

6. The system of claim 4, wherein if the testing component fails to produce a result above the criteria, a default multicast protocol is implemented.

* * * * *